United States Patent
Yoshigai

[11] Patent Number: 5,279,179
[45] Date of Patent: Jan. 18, 1994

[54] BRAKE OPERATING DEVICE FOR BICYCLES

[75] Inventor: Kenichi Yoshigai, Osaka, Japan

[73] Assignee: Yoshigai Kikai Kinzoku Co., Ltd., Osaka, Japan

[21] Appl. No.: 22,008

[22] Filed: Feb. 24, 1993

[30] Foreign Application Priority Data

Oct. 19, 1992 [JP] Japan .................. 4-280256

[51] Int. Cl.$^5$ .................. F16C 1/10; G05G 11/00
[52] U.S. Cl. .................. 74/502.2; 74/489; 74/500.5
[58] Field of Search .................. 74/502.2, 489, 523, 74/524, 526, 528; 188/24.12, 24.11

[56] References Cited

U.S. PATENT DOCUMENTS

| 4,611,500 | 9/1986 | Nagano | 74/489 |
| 4,667,785 | 5/1987 | Toyoda et al. | 74/528 X |
| 4,899,610 | 2/1990 | Bourret | 74/526 X |
| 4,916,967 | 4/1990 | Nakamura | 74/489 X |
| 4,977,792 | 12/1990 | Nagano | 74/502.2 |
| 5,065,643 | 11/1991 | Axtell | 74/523 X |
| 5,078,023 | 1/1992 | Scarborough | 74/502.2 |

FOREIGN PATENT DOCUMENTS

| 0389931 | 10/1990 | European Pat. Off. | 74/502.2 |
| 1025981 | 4/1953 | France | 74/489 |
| 1210326 | 3/1960 | France | 74/489 |
| 1326831 | 4/1963 | France | 74/502.2 |
| 3-292280 | 12/1991 | Japan | 74/502.2 |
| 4-37835 | 9/1992 | Japan | 74/502.2 |

Primary Examiner—Vinh T. Luong
Attorney, Agent, or Firm—Sixbey, Friedman, Leedom & Ferguson

[57] ABSTRACT

A brake operating device for bicycles, comprises a brake lever rotatably installed through a pivot on a housing mounted on a handlebar, an operating wire interlockingly connected to the brake lever through a wire connector, and a force transmission ratio adjusting means for adjusting a transmission ratio by moving the wire connector toward and away from the pivot in accordance with the operation of the brake lever. In this device, the force transmission ratio adjusting means comprises a long hole provided in the brake lever and guiding the wire connector in relation to the pivot, and a link pivotally installed at one end to the wire connector installed in the long hole and also pivotally supported at the other end on the housing through the other pivot than the pivot stated above.

4 Claims, 7 Drawing Sheets

BRAKE OPERATING DEVICE FOR BICYCLES

FIELD OF THE INVENTION AND RELATED ART STATEMENT

The present invention relates to a brake operating device for bicycles and, more particularly, to a brake operating device which is capable of pulling an operating wire interlockingly connected to a brake lever when the brake lever is operated.

In a conventional brake operating device for bicycles described above, the brake lever is pivotally supported on a housing mounted on a handlebar, and an operating wire is mounted in a bore provided in the base of the brake lever. Therefore, a wire connecting section for connecting the operating wire to the brake lever is so constituted that its position from a pivot for the brake lever will not change (as in a device disclosed for example in Examined Japanese Utility Model Publication HEI 4-37835).

According to the above-described conventional constitution, however, since a distance from the pivot for the brake lever to the connecting section of the operating wire is not subjected to any change, the value of force transmission ratio is not adjusted at each lever position, and is determined only approximately. In addition, since the overall stroke of the brake lever is limited and in addition the operating wire is connected to the brake lever in such a manner that the value of force transmission ratio becomes a minimum during the brake application stroke of the brake lever when a brake shoe is in contact with a tire rim, it is impossible to maintain a generally high ratio of transmission of power exerted to the brake lever side during the braking stroke. Consequently, there exists such a problem that a substantially great braking force can not be applied to the bicycle notwithstanding a hard pull of the brake lever. In addition, since the brake shoe moves largely even when the brake lever is pulled a little, it is difficult to control brake application to the bicycle by subtle brake lever touch. To obviate this disadvantage, therefore, there has been developed a technique to adjust the force transmission ratio by moving the wire connector toward, and away from, the brake lever pivot in accordance with brake lever operation as has been disclosed in Examined Japanese Patent Publication HEI 3-292280.

A brake operating device for bicycles disclosed in Examined Japanese Patent publication HEI 3-292280 is significant in its own way, but has the following problem.

That is, in a means for adjusting the force transmission ratio by moving the wire connector toward, and away from, the brake lever pivot, a cam follower provided at the wire connector is fitted in a long hole formed in the brake lever and also in a cam groove formed in a housing; therefore there takes place an excessive frictional resistance, resulting in heavy brake lever operation and accordingly in heavy, unsmooth braking operation.

The brake lever rotates on a fulcrum of its pivot, while the wire connector pulls the operating wire with the rotation of the brake lever. Therefore, merely fitting the cam follower of the wire connector in the long hole formed in the brake lever will cause a loss of pull of the wire to occur. It is, however, difficult to form a precision cam groove in an attempt to eliminate this loss.

OBJECTS AND SUMMARY OF THE INVENTION

It is a first object of the present invention to provide a brake operating device for bicycles which is capable of making a fine brake control while powerfully braking the bicycle with a little braking force.

It is a second object of the present invention to provide a brake operating device for bicycles which assures light, smooth brake application with little loss of pull of the wire by providing, in a housing, a link which rocks with the operation of the brake lever, as a means for moving the wire connector toward, and away from, the pivot.

It is a third object of the present invention to provide a brake operating device for bicycles which is so designed as to easily perform the adjustment of the force transmission ratio during brake lever operation between the starting end of movement and the finishing end of movement of the brake lever.

In the brake operating device for bicycles of the present invention, which comprises a brake lever 6 rotatably mounted through a pivot 5 to a housing 4 which is installed on a handlebar 2; an operating wire 8 interlockingly connected to the brake lever 6 through a wire connector 15; and a force transmission ratio adjusting means 19 for adjusting the force transmission ratio by moving the wire connector 15 toward, and away from, the pivot 5 in accordance with the operation of the brake lever 6, the following technical means have been adopted to accomplish the first and second objects previously stated.

That is, the present invention is characterized in that the force transmission ratio adjusting means 19 comprises a long hole 13 formed in the brake lever 6 for guiding the wire connector 15 in relation to the pivot 5 and a link 17 pivotally supported at one end by the wire connector 15 installed in this long hole 13 and also pivotally supported at the other end on the housing 4 through another pivot 18.

According to the present invention, therefore, since the force transmission ratio adjusting means 19 for adjusting the value of the force transmission ratio in accordance with the operation of the brake lever 6 consists of a long hole 13 formed in the brake lever 6 and the link 17 pivotally supported at one end by the wire connector 15 installed in the long hole 13 and also pivotally supported at the other end on the housing 4 through another pivot 18, it is possible to easily set, to each lever position, a force produced on the wire 8 side when the brake lever 6 is operated with a unit force in each lever position.

During the braking stroke, a great braking force can be applied to the bicycle because of a large force transmission ratio notwithstanding that a little force is exerted to the brake lever 6.

Furthermore, since the force transmission ratio adjusting means 19 uses the link 17, not the cam groove, the brake can operate with little frictional resistance and little pulling loss, assuring light, smooth operation of the bicycle.

In an attempt to accomplish the third object previously stated, the present invention is characterized in that there are provided pivot position changing means 24 which enable easily changing the position of the other pivot 17.

According to the present invention, therefore, the pivot position changing means 24 can adjust the position of the pivot 18 which is at the rocking center of the link 17, thereby enabling easy adjustment of the force transmission ratio.

BRIEF DESCRIPTION OF THE DRAWINGS

FIG. 8 is a side view showing a

DETAILED DESCRIPTION OF THE PREFERRED EMBODIMENT

Figure 1:
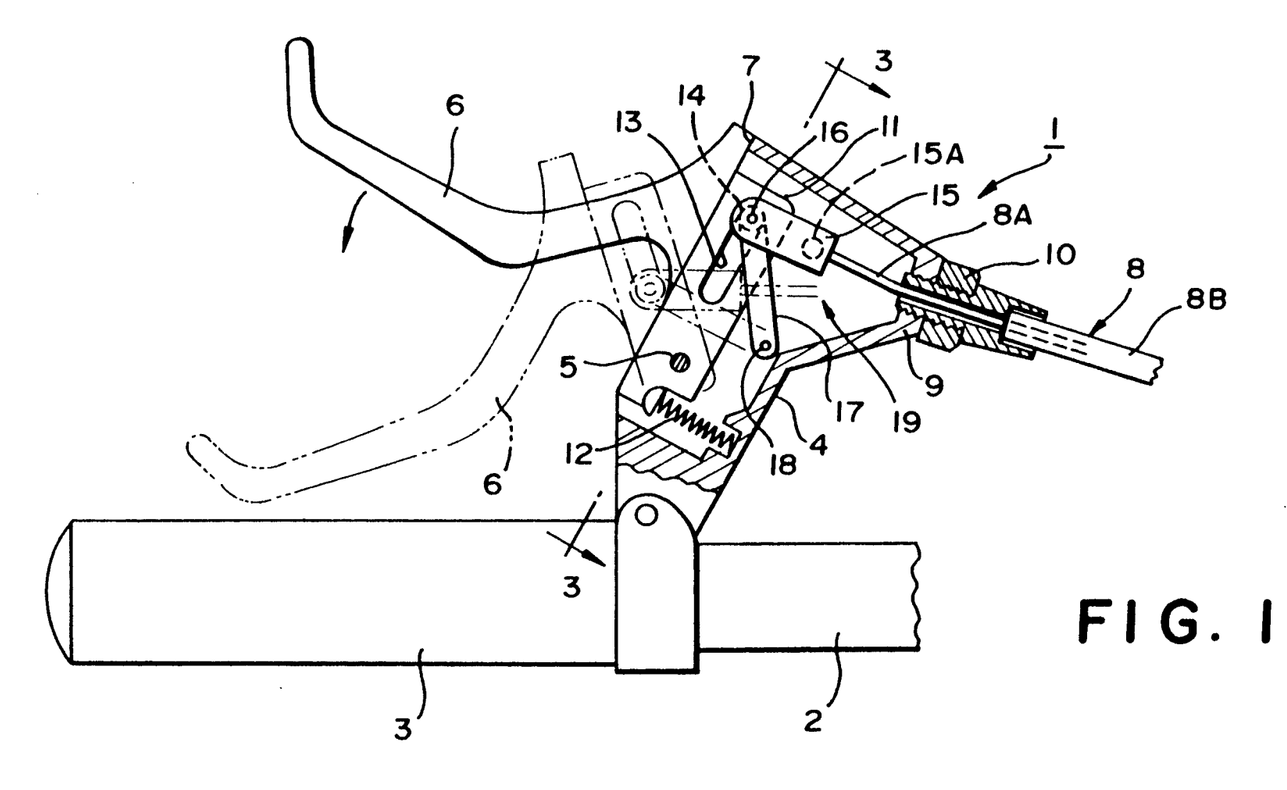
FIG. 1 is a partially cutaway side view showing an embodiment of a first feature of the present invention.
Figure 2:
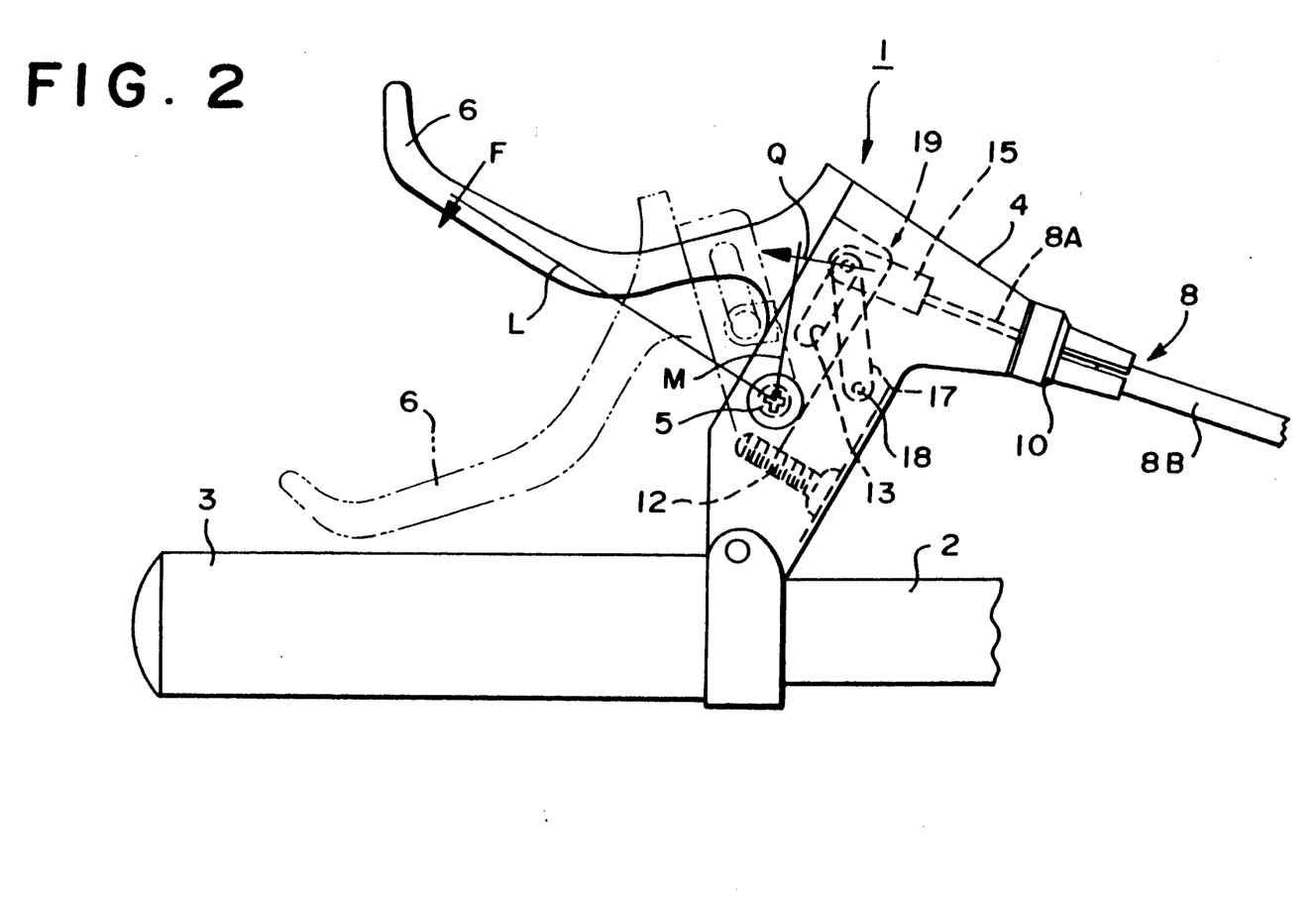
FIG. 2 is a side view showing the same embodiment and its principle of operation.

Hereinafter an embodiment of a brake operating device for bicycles according to the present invention will be explained with reference to the accompanying drawings. As shown in FIGS. 1 and 2, the brake operating device 1 for bicycles has a housing 4 mounted in the vicinity of a grip 3 of a handlebar 2, and a brake lever 6 rotatably supported on this housing 4 through a pivot 5.

The housing 4 is of a box type produced of an aluminum alloy, and has an opening section 7 at its back side. In this opening section 7 is installed a brake lever 6. In the front upper part is formed a mounting section 9 for installing the operating wire 8.

The operating wire 8 provided for transmitting the brake operating force consists of an inner wire 8A and an outer tube 8B covering the inner wire 8A. On the mounting section 9 the outer tube 8B is supported, and an outer tube receiving section capable of adjusting the length of exposure of the inner wire 8A with respect to the outer tube 8B is provided. Therefore, the inner wire 8A, when pulled, moves in relation to the outer tube 8B which is at a stop. That is, the brake operating device x 1 for bicycles is used to apply the brake to the bicycle by pulling the inner wire 8A, which is interlockingly connected to the brake lever 6, in relation to the outer tube 8B as the brake lever 6 is operated, and by pressing a brake shoe of a braking device (not illustrated) mounted on the wheel side against the tire rim.

The brake lever 6 is provided with a through bore at the base for inserting the pivot 5, and has an approximately U-shaped cross section in the longitudinal direction of the operating section which extends out on the grip 3 side when mounted on the handlebar 2. On the base side of the brake lever 6 is formed a narrow-width section 11 which can go into, and out of, the housing 4 through the opening section 7 when the brake lever is swung upwardly and downwardly.

There is installed a lever return spring 12, which is shown in a form of a coil spring, between the lower part of the narrow-width section 11 of the brake lever 6 and the front wall of the housing 4 opposite thereto. The base of the brake lever 6 is pressed against the end face of the opening section 7 by the elastic force of this spring 12, thereby holding the brake lever 6 at the starting end of movement.

As shown in FIGS. 1 and 3 to 5, the narrow-width section 11 of the brake lever 6 has a pair of right and left long holes 13, which are long allowable surfaces of travel formed on the radial lines extending from the center of the pivot 5. A roller 14 fitted in this long hole 13 is supported by a pin 16 to the wire connector 15.

The wire connector 15 is a bifurcated metal part as viewed from the top, and has a nipple 15A to which the inner wire 8A is connected. The bifurcated metal part is supported at both ends of the pin 16. Between a pair of rollers 14 mounted on the midway of the pin 16 is pivotally supported one end of the link 17; the other end of the link 17 is pivotally supported on both side walls of the housing 4 through another pivot 18.

Therefore, the pivot 5 which functions as a support point of the brake lever 6 and the pivot 18 which serves as a support point of the link 17 are disposed in different positions; when the brake lever 6 which rotates on the center of the pivot 5 is operated, the roller 14 of the wire connector 15 moves along the long hole 13, and at the same time the link 17 turns on the center of the other pivot 18. Therefore, the roller 14 is forced to move closer to, and away from, the pivot 5 along the long hole 13, thereby adjusting the force transmission ratio. The long hole 13 and the link 17, therefore, serve as the force transmission ratio adjusting means 19.

The force transmission ratio, as shown in FIG. 2, is meant by a ratio determined by dividing, by a unit force F applied to the brake lever 6, an output Q produced as a power to pull the inner wire in a direction along the operating wire 8 when the unit force F as an input is applied to the brake lever 6.

That is, in FIG. 2, a moment acting on the brake lever 6 is determined by the multiplication of the force F to be added in each lever position by the length L of an input arm specified from the length of a leg of a perpendicular produced from the pivot 5 downwardly to the directional line of force applied along the direction of the force applied. The value and direction of this input F vary with the operation of the brake lever 6, but since the amount of this variation may be regarded as little, the length L of the input arm becomes nearly constant during the overall stroke of the brake lever despite each lever position. In the meantime, the moment on the wire connector 15 side is given by the multiplication of the output Q resulting from the input F applied to the brake lever 6 and acting in the direction of extension of the inner wire 8A by the length M of the output arm that is specified by the length of the leg of the perpendicular produced downwardly from the pivot 5 to the directional line of output along the direction of extension of the inner wire 8A. The moment on the brake lever 6 side and that on the wire connector 15 side are nearly of the same value, thence establishing the following equation.

$$F \times L = Q \times M$$

$$Q = (F \times L)/M$$

Here, the output Q can be adjusted by changing the length M of the output arm. Therefore, in the present embodiment of the present invention, the brake lever 6, when operated, is forced to turn on the center of the pivot 18 of the link 17 to thereby move the roller 14 close to, and away from, the pivot 5 of the brake lever 6 along the long hole 13, thereby adjusting the force transmission ratio.

Figure 4:
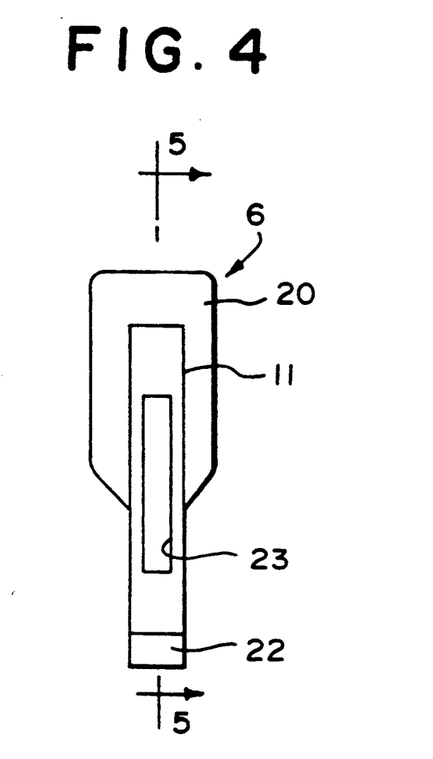
FIG. 4 is a front view of a brake lever.
Figure 5:
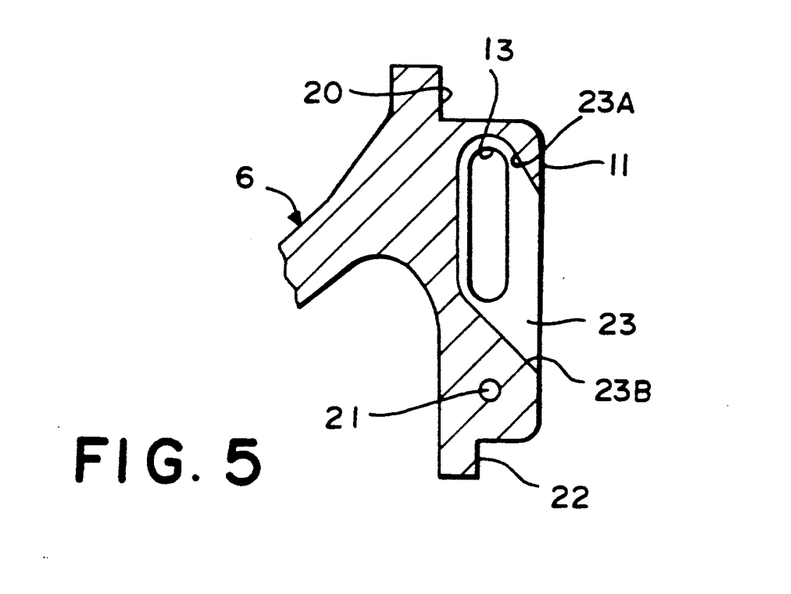
FIG. 5 is a sectional view taken along line B—B of FIG. 4.

As shown in FIGS. 4 and 5, the narrow-width section 11 of the brake lever 6 is of a vertically long flat-plate type. The base of the lever serves as a contact portion 20 which contacts the opening section 7 shown in FIG. 1; and therefore there are formed an inserting bore 21 for the pivot 5 at the lower part of the narrow-width section 11 and a receiving surface 22 of the spring 12. In the front face of the narrow-width section 11 is provided a longitudinal window 23 in which the link 17 is inserted. The upper wall 23A of the longitudinal window 23 serves as a starting end of movement (pivotal movement) of the link 17, while the lower wall 23B serves as a finishing end of movement (pivotal movement) of the link 17.

Figure 3:
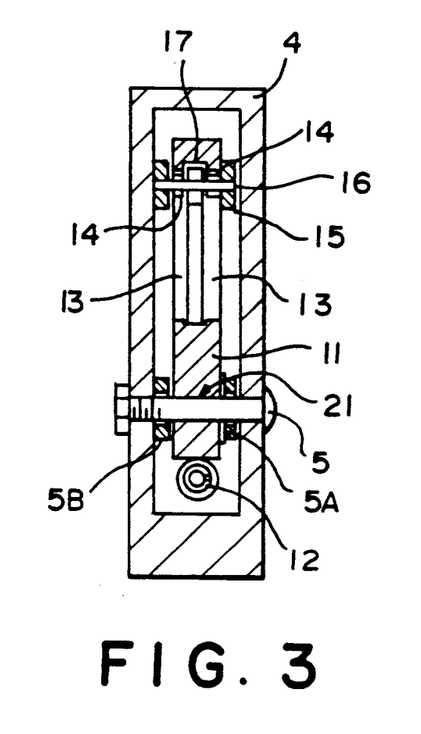
FIG. 3 is a sectional view taken along line A—A of FIG. 1.

In FIG. 3, numerals 5A and 5B denote distance collars, which are produced of a resin.

FIGS. 6 to 10 show two embodiments in the second feature of the present invention; in either of the embodiments, there is provided a pivot position changing means 24 for changing the position of the other pivot 18 which serves as the center of pivotal movement of the link 17, thereby enabling the optimum adjustment of the force transmission ratio in accordance with the operation of the brake lever 6.

Accordingly, since the constitution of the brake operating device except the pivot position changing means 24 is common to the constitution stated above, the common members are designated by the same reference numerals. Hereinafter the pivot position changing means 24 will be explained.

Figure 6:
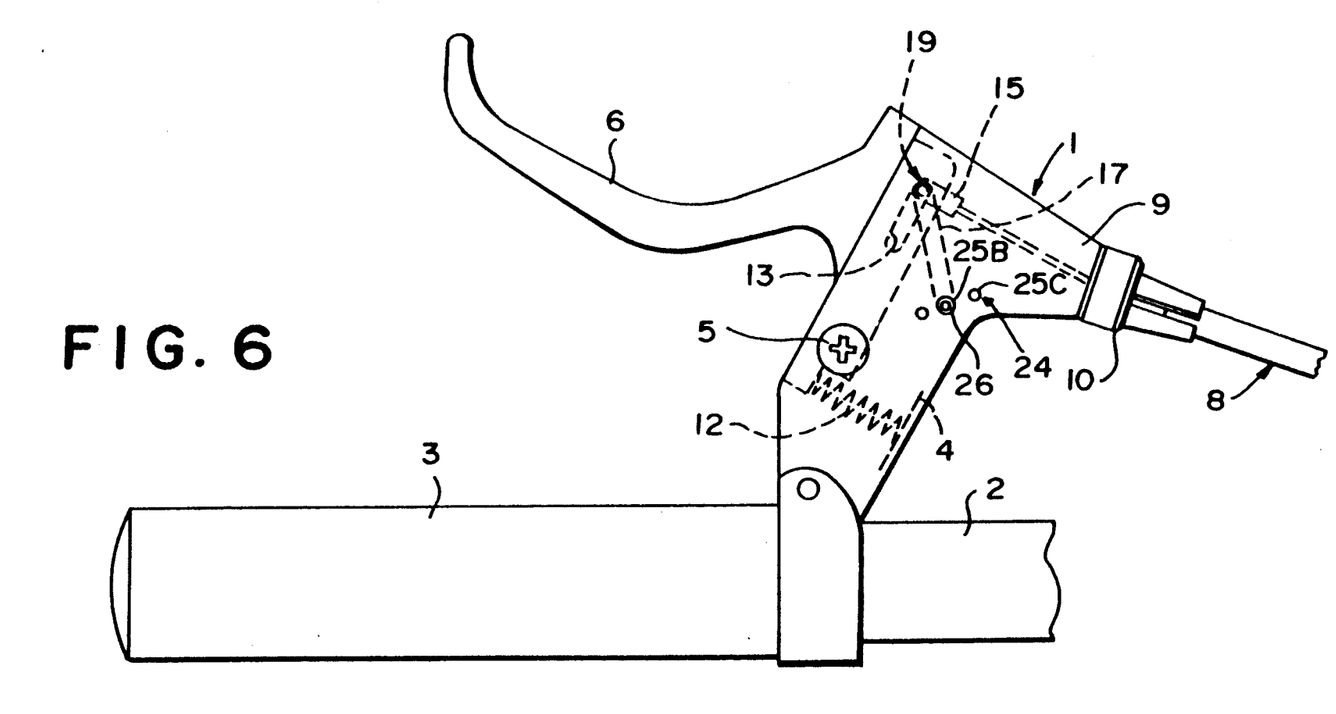
FIG. 6 is a side view showing a first embodiment of a second feature of the present invention.
Figure 7:
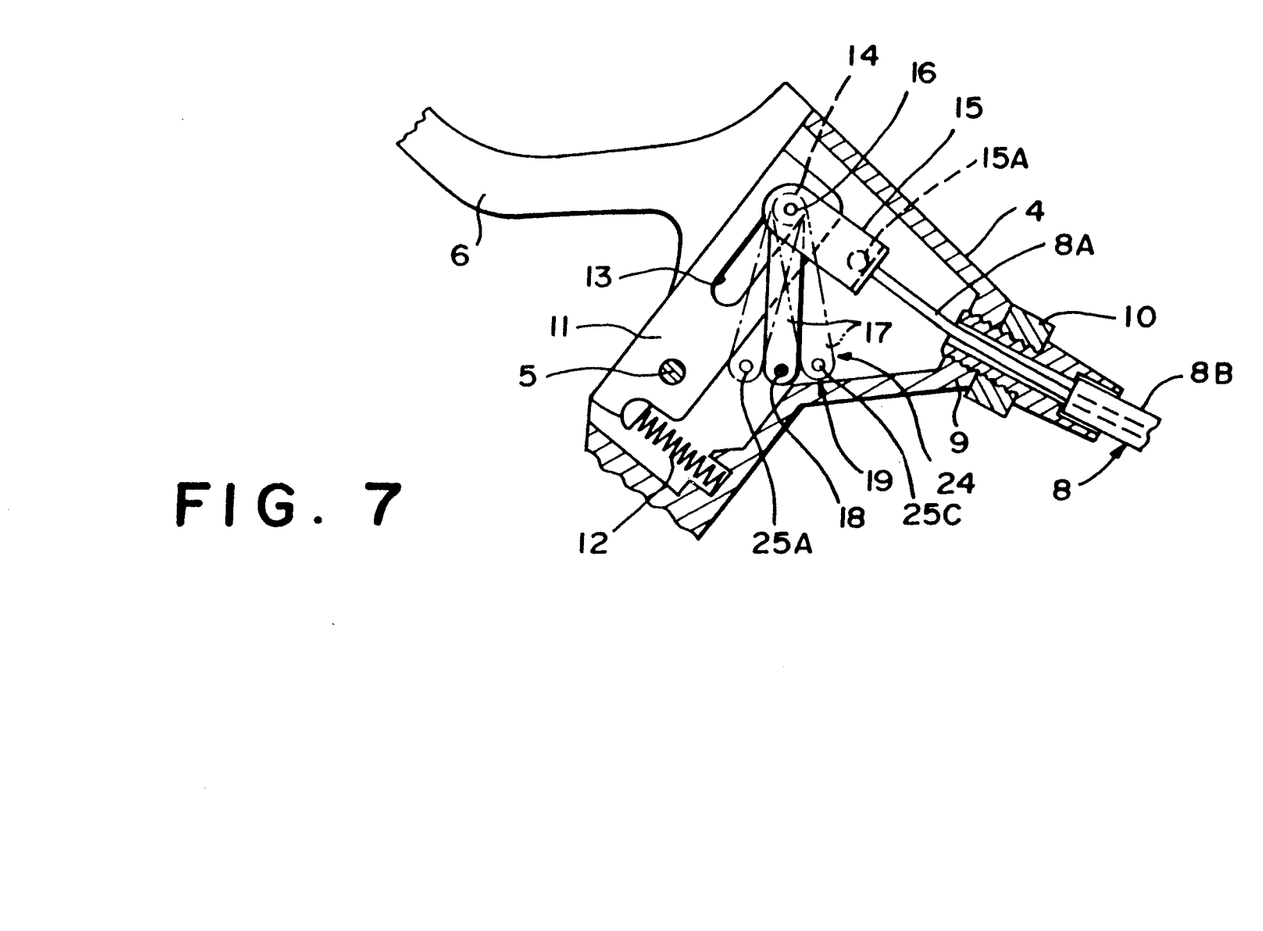
FIG. 7 is a partially enlarged sectional view of FIG. 6.

FIGS. 6 and 7 show a plurality of pivot inserting bores 25A, 25B and 25C formed in both side walls of the housing 4, in one of which the pivot 18 is inserted. The base of the link 17 is pivotally supported on the housing 4 through this pivot 18.

The pivot 18 is furnished with a head on one end, and inserted with its headless end first. On the headless end is installed a locking member 26 such as a cotter pin, nut, etc.

Figure 8:
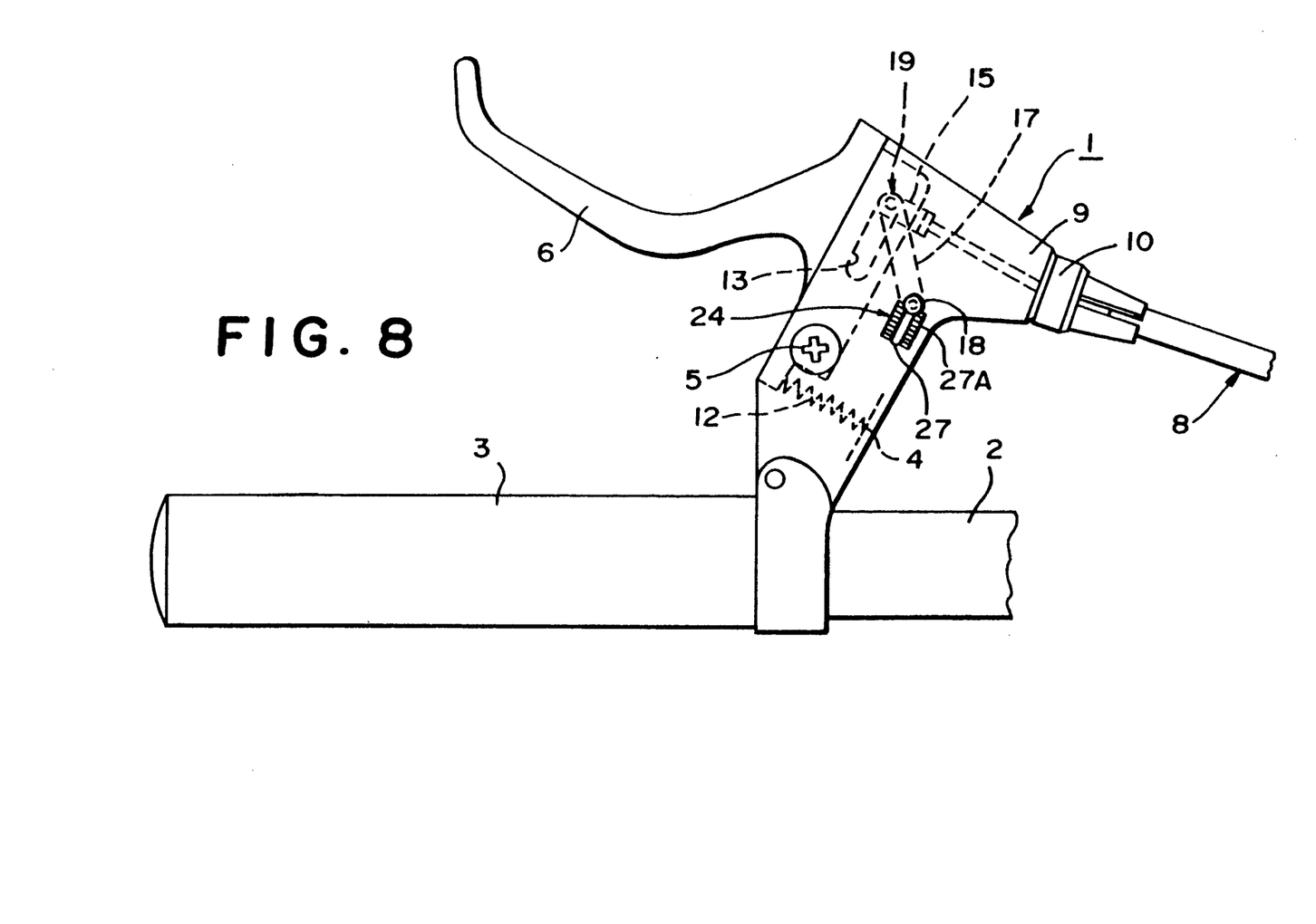
FIG. 8 is a side view showing a second embodiment of a second feature of the present invention.
Figure 9:
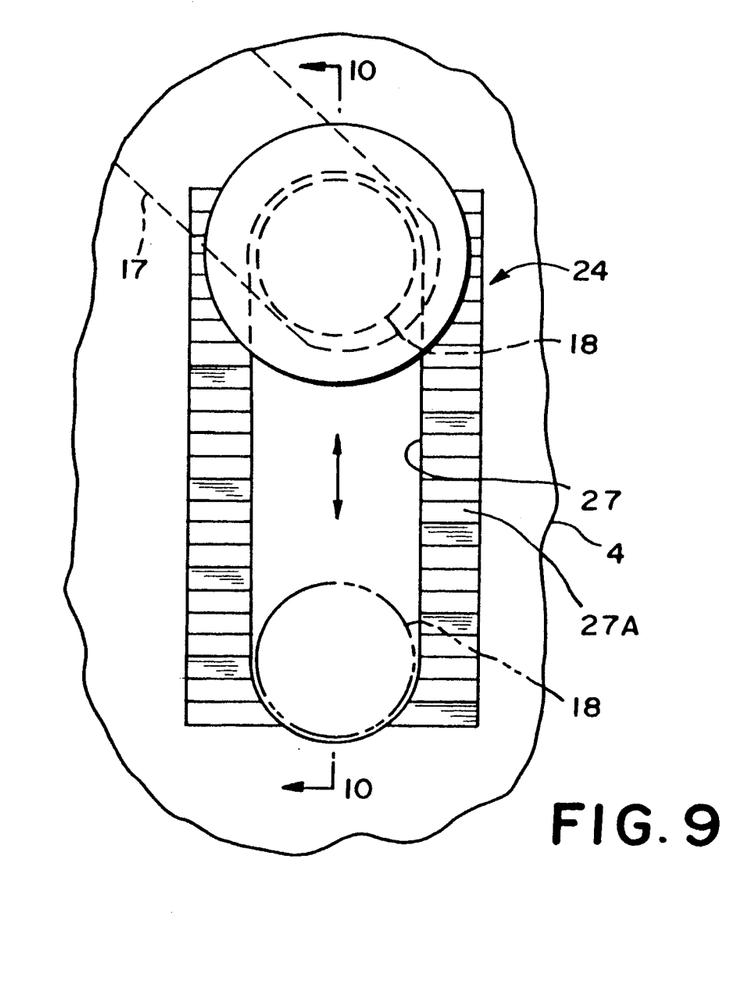
FIG. 9 is a partially enlarged view of FIG. 8.
Figure 10:
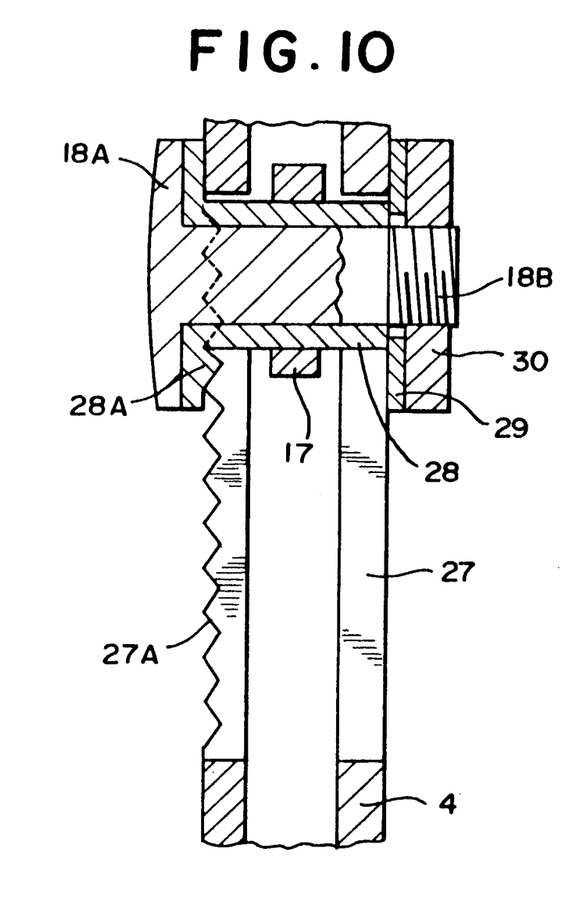
FIG. 10 is a sectional view taken along line C—C of FIG. 9.

In FIGS. 8 to 10, a long hole 27 having sawtooth-shaped engaging projections 27A on the hole edge is formed in either side wall of the housing 4; in this long hole 27 is inserted the pivot 18 having a head 18A through a resinous bushing 28. In the collar of this bushing 28 is formed an engaged section 28A which can be engaged with a disengaged from an engaging projection 27A. Furthermore a nut 30 is tightened on a threaded portion 18B of the pivot 18 through a resinous plain washer 29. In this embodiment, the link 17 is rotatably supported on the bushing 28.

Therefore, the position of the pivot 18 is changed by loosening the nut 30, disengaging the engaged section 28A from the engaging projection 27A, and then by sliding the pivot 18 together with the bushing 28 along the long hole 27. The pivot 18 is fastened by tightening the nut 30 again.

The embodiment of the present invention that has been illustrated above is one example and may be subjected to the following changes of design.

①: Application not only to a flat handlebar but to a dropped handlebar.

②: Use of only an inner wire. The outer tube is dispensed with.

③: Adoption of a coil spring for a brake lever return spring installed on the brake lever pivot.

④: Adoption of a flanged roller for the roller traveling along the long hole, or use of a sliding shoe block, not a roller.

⑤: Arrangement of a pair of links on both the right and left sides of the narrow-width section, not insertion of the links through the longitudinally long window of the narrow-width section.

⑥: Formation, on the head of the pivot, of the engaged section which allows the change of link pivot position.

The wire connector shall include the fitting of an inner wire nipple in the long hole.

According to the present invention, it is possible to provide a brake operating device for bicycles which is capable of making a fine brake adjustment while braking the bicycle most effectively with a little braking force.

Furthermore, even under a severe braking condition in which the brake is applied with the brake shoe and the tire rim blocked, the hand will feel little load even if the brake lever is pulled hard, thus assuring proper and reliable brake application to the bicycle.

Furthermore, since the link swinging in interlock with the brake lever is used, that is, the cam groove is not used, to adjust the force transmission ratio, there takes place little frictional resistance, enabling light and smooth brake application with little loss of pull of the brake lever.

What is claimed is:

1. A brake operating device for bicycles, comprising: a brake lever rotatably installed through a pivot on a housing mounted on a handlebar; an operating wire interlockingly connected to said brake lever through a wire connector; and a force transmission ratio adjusting means for adjusting a transmission ratio by moving said wire connector close to and away from said pivot in accordance with the operation of said brake lever; said force transmission ratio adjusting means having a long hole formed in said brake lever and guiding said wire connector with respect to said pivot, and a link pivotally supported at one end by said wire connector installed in said long hole and also pivotally supported at the other end on said housing through another pivot than said pivot.

2. A brake operating device for bicycles, according to claim 1, further comprising: a pivot position changing means for changing the position of said another pivot.

3. A brake operating device for bicycles as claimed in claim 2, wherein said pivot position changing means comprises a plurality of pivot inserting bores formed in said housing, and a locking member for locking said pivot removably inserted in said pivot inserting bore.

4. A brake operating device for bicycles as claimed in claim 2, wherein said pivot position changing means is formed in said housing, and comprises a long hole having engaging projections on its hole edge, and an engaged section which can be engaged with and disengaged from said engaging projections, for locking said pivot inserted in said long hole.

* * * * *